United States Patent [19]
Man

[11] Patent Number: 5,741,062
[45] Date of Patent: Apr. 21, 1998

[54] INTEGRAL CAMOUFLAGE FLASHLIGHT

[75] Inventor: Stephen Shiu-Fai Man, Kwai Chung, Hong Kong

[73] Assignee: Rayovac Corporation, Madison, Wis.

[21] Appl. No.: 698,790

[22] Filed: Aug. 16, 1996

[51] Int. Cl.$^6$ ..................................................... F21L 15/00
[52] U.S. Cl. .......................... 362/208; 362/189; 362/202; 362/806; 40/660
[58] Field of Search ............................ 40/555, 638, 660; 362/186, 189, 202, 205, 208, 806; 29/428

[56] References Cited

U.S. PATENT DOCUMENTS

| | | | |
|---|---|---|---|
| 1,812,134 | 6/1931 | Bragger et al. | 428/30 |
| 1,989,703 | 2/1935 | Leguillon | 428/195 |
| 2,001,363 | 5/1935 | Joers | 362/158 |
| 2,156,553 | 5/1939 | Vendope | 40/660 |
| 2,335,852 | 12/1943 | Frank | 40/555 |
| 2,493,205 | 1/1950 | Muldoon | 362/190 |
| 2,571,193 | 10/1951 | Broderson | 264/77 |
| 2,599,253 | 6/1952 | Gits | 362/208 |
| 2,781,597 | 2/1957 | Doane | 40/616 |
| 3,079,244 | 3/1963 | Molitor et al. | 264/246 |
| 4,210,953 | 7/1980 | Stone | 362/189 |
| 4,415,954 | 11/1983 | Schaefer | 362/202 |
| 5,001,455 | 3/1991 | Starchevich | 40/555 |
| 5,016,148 | 5/1991 | Kohm | 362/208 |
| 5,087,488 | 2/1992 | Cakmakci | 428/31 |
| 5,307,251 | 4/1994 | Shaffer | 362/186 |

*Primary Examiner*—Alan Cariaso
*Attorney, Agent, or Firm*—Lathrop & Clark

[57] ABSTRACT

A flashlight outer sleeve is formed of rubber which has an integral camouflage pattern. Because the multicolored elements of the sleeve are fused together, a scratch or abrasion will not appreciably alter its appearance. The rubber sleeve is formed in a compression molding process. Multilayer rubber sheet assemblies are prepared for the compression molding process by first die-cutting camouflage pattern shapes from thin sheets of rubber of two or more colors. The die cut shapes are placed on rectangular base sheets and pressed into temporary engagement to create multilayer sheet assemblies. The sheet assemblies are disposed in conventional rubber compressing molding molds and are heated. As the base sheet and the pattern shapes are comprised of identical rubber material, except for color, the heated rubber flows such that the multilayer assemblies take on the shape of the molded parts. Furthermore, the pattern shapes fuse with the base sheet material to form a rubber sleeve which has an integrally molded camouflage pattern. The appearance of the camouflage pattern, while being generally governed by the shape and placement of the pattern shapes, varies from part to part due to the molding process. More importantly, the color regions, while distinct from one another, have blended edges which advantageously contribute to the appearance of a more natural camouflage pattern. The molded rubber sleeve is fitted over a stiff plastic styrene body to form a flashlight.

5 Claims, 2 Drawing Sheets
(1 of 2 Drawing(s) in Color)

5,741,062

INTEGRAL CAMOUFLAGE FLASHLIGHT

FIELD OF THE INVENTION

The present invention relates generally to portable flashlights and lanterns and more particularly to those having multicolored surfaces.

BACKGROUND OF THE INVENTION

Portable battery powered flashlights and lanterns are used wherever it is needed to direct light onto some object or region which is remote from a working light fixture. Flashlights range from very small units, sometimes known as "penlights," to larger area lights, sometimes referred to as lanterns. For purposes of this application, all portable battery powered lights will be referred to as flashlights.

Flashlights for specialized purposes vary not only in size, but also in color and material construction. Flashlights which will see rugged use in difficult conditions, for example, may be constructed of metal. Flashlights to be carried in a purse or worn on a chain may be of molded plastic of colors to match other fashion accessories. Thus in addition to being functional, flashlights by their style, color, and construction can highlight the user's attitude or demeanor, be it playful, serious, or industrious.

Although in many instances flashlights are molded or painted in bright colors in order to facilitate finding the device on short notice, there are times when the flashlight should be as inconspicuous as possible. Many outdoors activities, such as hunting, bird and animal watching and photography, etc., require the outdoorsman to maintain a low profile so as not to prematurely disturb the animals which are being pursued. It is not uncommon for a hunter to wear camouflage pants, shirt, jacket and hat to best mask himself visually from sensitive animals. A brightly colored flashlight would at best clash with this garb, and at worst might be sufficiently brilliant to alert an animal to the outdoorsman's presence.

Flashlights with patterned surfaces designed to match outdoors environments have been used by outdoorsman to reduce visual profile. Known flashlights of this type have had colored patterns applied to the flashlight body. In one known example, colored materials are floated on a liquid medium, and a metal flashlight body is then dipped into the colors such that random patterns of colors adhere to the metal. Other approaches to varying the color of a flashlight body include painting, spray painting, hot stamping, or gluing on of patches of color. Although often yielding an attractive and useful surface pattern, applied coloring of this sort has the drawback of being a relatively thin nonyielding layer which is subject to cracking and scratching, or in the case of glue-on patches of peeling off from the main body. Although a minor scratch or crack in a camouflage surface may not seriously degrade the camouflage performance, it does contribute to a perception by the consumer of a deteriorated or "used" item. For increased perception of value, consumers desire their purchases to maintain a near as-new appearance through extended periods of use.

Compression molding rubber processes are known for achieving sharp line distinctions between colored rubber in articles, but this process, using different types of rubber is more likely to create sharp edged regions of color, rather than the more blended borders desirable for a camouflage pattern.

What is needed is a flashlight for outdoors use which has an effective and attractive camouflage pattern which is less susceptible to scratching and wear.

SUMMARY OF THE INVENTION

The flashlight of this invention has an outer sleeve formed of rubber which has an integral camouflage pattern. The sleeve is mounted to a stiff styrene plastic flashlight body. Because the multicolored elements of the sleeve are fused together, a scratch or abrasion to the sleeve may split the surface, but will not appreciably alter its appearance. Furthermore, the resilient rubber will tend to bend away rather than scuff or tear from an impact. The rubber sleeve is formed in a compression molding process. Multilayer rubber sheet assemblies are prepared for the compression molding process by first die-cutting camouflage pattern shapes from thin sheets of rubber of two or more colors. The die cut shapes are placed on rectangular base sheets and pressed into temporary engagement to create multilayer sheet assemblies. The sheet assemblies are disposed in conventional rubber compression molds and are heated. As the base sheet and the pattern shapes are comprised of identical rubber material, except for color, the heated rubber flows such that the multilayer assemblies take on the shape of the molded parts. Furthermore, the pattern shapes fuse with the base sheet material to form a rubber sleeve which has an integrally molded camouflage pattern. The appearance of the camouflage pattern, while being generally governed by the shape and placement of the pattern shapes, can vary from part to part due to the molding process. More importantly, the color regions, while distinct from one another, have blended edges which advantageously contribute to the appearance of a more natural camouflage pattern. The molded rubber sleeve is fitted over the styrene body to form the flashlight of this invention.

It is an object of the present invention to provide a camouflage flashlight having surface markings which are resistant to cracking, scratching and removal by abrasion.

It is an additional object of the present invention to provide a process for forming a flashlight sleeve having an integrally molded camouflage pattern.

It is yet another object of the present invention to provide a flashlight having a camouflage pattern in which regions of color are subtly blended.

Further objects, features and advantages of the invention will be apparent from the following detailed description when taken in conjunction with the accompanying drawings.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

DESCRIPTION OF THE PREFERRED EMBODIMENT

Figure 1:
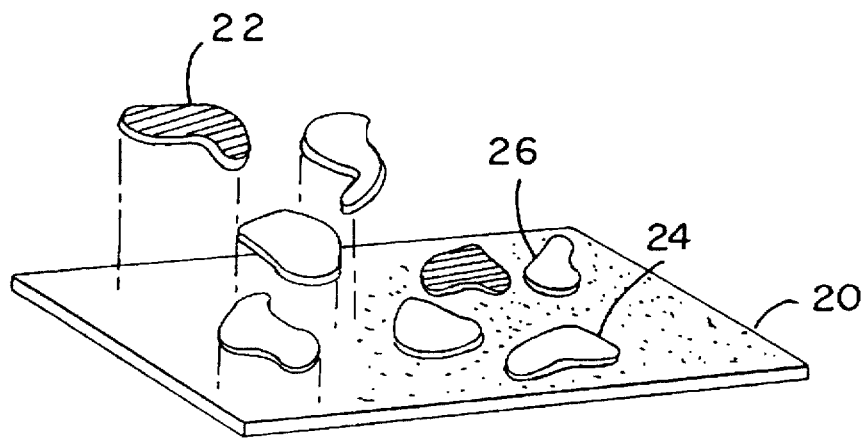
FIG. 1 is an exploded isometric view of the prepared rubber sheet assembly for processing in the process of this application.
Figure 2:
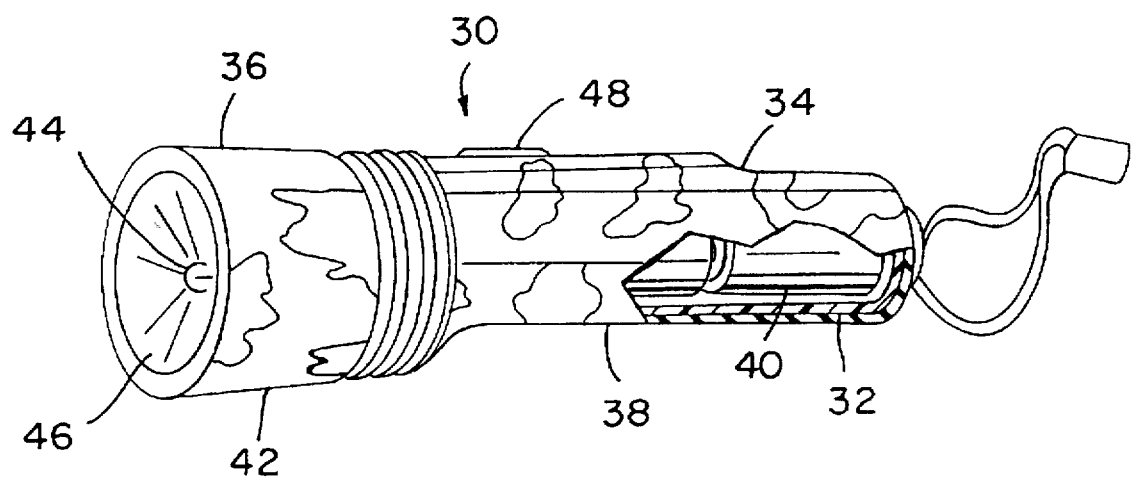
FIG. 2 is a perspective view of the flashlight of this invention, partially broken away in section to show the plastic body and interior.
Figure 3:
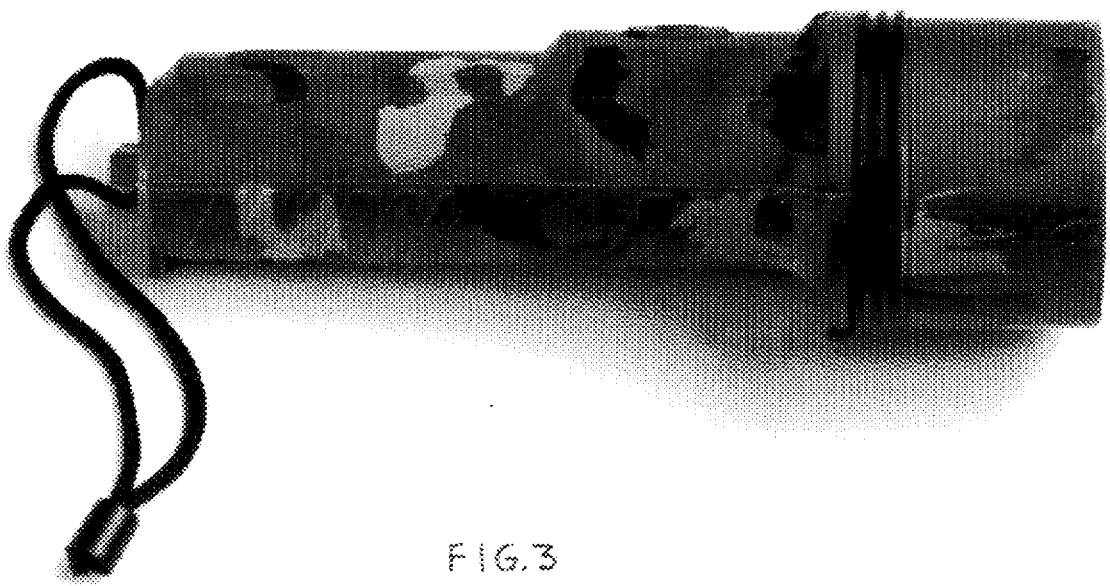
FIG. 3 is a side elevational view of a flashlight with rubber sleeve formed with integral camouflage design according to the process of this invention.

Referring more particularly to FIGS. 1–2, wherein like numbers refer to similar parts, a flashlight 30 of this invention is shown in FIGS. 2 and 3. The flashlight 30 has a stiff plastic body 32, typically injection molded of styrene, to which flexible rubber sleeves 34, 36 are mounted in a friction fit. The body is composed of two pieces, a handle 38, which also serves to receive the batteries 40, and a head 42 which houses the light bulb 44 and the reflector 46. The rubber head sleeve 36 is mounted to the plastic head 42, and the rubber handle sleeve 34 is mounted to the plastic handle 38. The head 42 screws on to the handle 38 to form a closed flashlight. In the respects described thus far the flashlight 30 is of conventional construction. It should be noted that the flashlight may be manufactured in a wide variety of shapes and sizes, designed to operate off any type of battery.

The novel aspects of the flashlight 30 are best shown in FIG. 3 in which the camouflage pattern on the sleeves 34, 36 is displayed in a photographic representation. The camouflage pattern is integrally formed with the sleeves, and thus is durable and scratch-resistant.

The sleeves are formed in a rubber compression molding process in such a way that the colors of the pattern are fused to one another with a blending between color regions. In a conventional rubber compression molding process, sheets of rubber, usually thin rectangular elements, are positioned within metal molds which are heated to form the sheets to the desired shape. The flashlight of this invention is produced by a method which incorporates this conventional process, but the advantageous appearance of the molded rubber sleeve is obtained by using as the starting sheet a multilayer assembly 24 of rubber elements.

The multilayer assembly 24, shown in FIG. 1, is comprised of a base layer of rubber, approximately ⅛ inch thick onto which pattern shapes 22, 26 are pressed. The pattern shapes 22, 26 are preferably formed from rubber sheets substantially thinner than the base layer, for example 1/80 inch thick. The pattern shapes are preferably die cut from thin sheets of colored rubber, and will typically include light colored shapes 26 and dark colored shapes 22. The outlines of the shapes 22, 26 may be varied to obtain the best camouflage pattern distribution of colors on the base layer, which typically will be of an intermediate intensity or color. In an exemplary camouflage pattern the base layer may form a background of green, and the pattern shapes include beige, brown, and black elements. To prepare the multilayer assemblies 24 for molding, workers position the pattern shapes in a random appearing but planned array, to achieve the necessary proportions of colors to create the camouflage appearance. The individual pattern shapes 22, 26 are pressed with a sharp implement or pin to dimple or depress a section of the pattern shape into engagement with the base layer 20. This dimpling is sufficient to retain the pattern shapes on the base layer prior to molding. The result of this placement is a random pattern with well defined ratios of colors. The pattern pieces are not disposed in chance arrangement, to avoid a collection of similar colors which would defeat the purpose of a camouflage arrangement. There is thus an ordered laydown of the colored pattern shapes.

The key to obtaining the desired blending between the pattern shapes 22, 26 and the base layer 20 is that both be comprised of substantially similar types of rubber treated in substantially similar manners. Thus conventional rubber types and composites may be used for both the pattern shapes and the base layer, so long as the two layers are of similar composition. For example, #3 smoked rubber may be mixed with pigment in a Banbury mixer to obtain the desired pigmentation. As in conventional compression molding elements, $CaCO_3$ is added to the rubber along with conventional amounts of lubricant, accelerators, and antioxidants. After which the sheets are masticated by rolling and stored, a small quantity of sulfur is added as a vulcanization agent in a roller mill, a stearate powder is applied to one side of the sheets to prevent undesired adhesion, and the sheets are then cut to form rectangular base layers or irregular pattern shapes. The rubber is also preferably masticated, to soften it.

Two multilayer assemblies 24 are positioned in a compression mold, one in each half to define the two sides of the generally tubular handle sleeve 34 or the head sleeve 36. Typically a separate mandrel is positioned between the two mold halves to define the hollow interior of the sleeve. The mold is closed on the multilayer assemblies 24 and maintained at between about 160°–180° C. for about 1 ½ to 2 minutes. During this time the rubber of the base layer 20 and the pattern shapes 22, being of similar composition, react in a similar fashion to being heated, and the rubber flows to fuse the pattern shapes to the base layer. At the same time, the boundaries between the pattern shapes and the base layer while remaining distinct, loose some of their sharpness, as fine amounts of rubber of different colors flow above and below the boundary. As shown in FIG. 3, the resultant camouflage pattern has the desired effect of a slight blending between color patches, and having quantities of color in a predetermined proportion. Another desirable effect of the process of this invention is that because of a certain amount of flowing, and because of the hand placement of the pattern shapes, each flashlight varies somewhat from every other.

The molded sleeves are then removed from the compression molds and allowed to cool. The flashing is removed, and the sleeves are fitted over the plastic handle 38 and head 42, and the body 32 is assembled with the light bulb 44 and reflector 44 and assorted electrical contacts, wires and a switch 48 which is connected between the batteries and the light bulb to selectively activate the bulb.

It should be noted that although particular colors and pattern shapes have been illustrated and described other colors and shapes suited for various camouflage patterns may also be employed.

It is understood that the invention is not limited to the particular construction and arrangement of parts herein illustrated and described, but embraces such modified forms thereof as come within the scope of the following claims.

I claim:

1. A camouflage patterned flashlight formed by the process comprising the steps of:
   a) positioning a plurality of rubber pattern shapes on a rubber base layer to form a desired arrangement of colors, wherein the thickness of each pattern shape is less than the thickness of the base layer, and wherein the pattern shapes and base layer are formed of rubber of similar kind, except for color, and wherein the pattern shapes differ in color from the color of the base layer;
   b) engaging the pattern shapes on the base layer to form a rubber multilayer assembly;
   c) positioning the multilayer assembly in a compression mold;
   d) heating the compression mold to cause a flowing of the pattern shapes and the base layer to fuse the pattern shapes to the base layer and form the multilayer assembly into the shape of a flashlight sleeve; and
   e) removing the molded multilayer assembly from the compression mold and attaching the molded assembly to a flashlight body so that the arrangement of colors faces outwardly.

2. The flashlight of claim 1 wherein the rubber composing the pattern shapes and the base layers comprises #3 smoked rubber.

3. The flashlight of claim 1 wherein the pattern shapes include shapes which are beige, brown, black, and white in color, and wherein the base layer is green in color, the arrangement of colors thereby forming a camouflage pattern.

4. The flashlight of claim 1 wherein the heating step comprises heating the multilayer assembly in the compression mold to between about 160°–180° C. for about 1 ½ to 2 minutes.

5. A camouflage patterned flashlight comprising:

a) a stiff plastic body;

b) a sleeve engaged with the body to define an outwardly facing surface, the sleeve being formed by positioning a plurality of rubber pattern shapes on a rubber base layer to form a desired arrangement of colors, wherein the thickness of each pattern shape is less than the thickness of the base layer, and wherein the pattern shapes and base layer are formed of rubber of similar kind, except for color, and wherein the pattern shapes differ in color from the color of the base layer and the engaged pattern shapes and base layer are heated in a compression mold to cause a flowing of the pattern shapes and the base layer to fuse the pattern shapes to the base layer;

c) a reflector;

d) at least one battery;

e) a light bulb positioned in the reflector; and f) a switch for selectably activating the light bulb.

* * * * *